(12) United States Patent
Hatakeyama

(10) Patent No.: US 8,477,206 B2
(45) Date of Patent: Jul. 2, 2013

(54) IMAGE PROCESSING APPARATUS AND IMAGE PROCESSING METHOD FOR PERFORMING IMAGE RESTORATION USING RESTORATION FILTER

(75) Inventor: Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 12/568,603

(22) Filed: Sep. 28, 2009

(65) Prior Publication Data

US 2010/0079626 A1 Apr. 1, 2010

(30) Foreign Application Priority Data

Sep. 30, 2008 (JP) ................................. 2008-252323
Sep. 30, 2008 (JP) ................................. 2008-252324

(51) Int. Cl.
*H04N 5/228* (2006.01)
(52) U.S. Cl.
USPC ...................................... 348/222.1; 382/254
(58) Field of Classification Search
USPC .......... 348/335, 251, 222.1; 359/16; 382/254, 382/260, 273, 276, 280
See application file for complete search history.

(56) References Cited

U.S. PATENT DOCUMENTS

| | | | | |
|---|---|---|---|---|
| 6,697,522 B1 * | 2/2004 | Ishikawa | ........................ | 382/167 |
| 2005/0069218 A1 * | 3/2005 | Chen | ............................. | 382/274 |
| 2006/0239549 A1 * | 10/2006 | Kelly et al. | .................... | 382/167 |
| 2007/0116375 A1 * | 5/2007 | Utsugi et al. | .................. | 382/264 |
| 2007/0126892 A1 * | 6/2007 | Guan | ........................ | 348/240.99 |
| 2007/0146689 A1 * | 6/2007 | Araki et al. | ................. | 356/124.5 |
| 2009/0219419 A1 * | 9/2009 | Kawasaka | ..................... | 348/251 |

FOREIGN PATENT DOCUMENTS

| | | | |
|---|---|---|---|
| JP | H06-113309 | A | 4/1994 |
| JP | 2000-156785 | A | 6/2000 |
| JP | 2000186979 | A | 7/2000 |
| JP | 2001-136540 | A | 5/2001 |
| JP | 2004-241991 | A | 8/2004 |
| JP | 2005202276 | A | 7/2005 |
| JP | 2006-270918 | A | 10/2006 |
| JP | 2006279359 | A | 10/2006 |
| WO | WO 9967743 | A1 * | 12/1999 |
| WO | WO 2007055179 | A1 * | 5/2007 |

\* cited by examiner

*Primary Examiner* — Nelson D. Hernández Hernández
(74) *Attorney, Agent, or Firm* — Canon U.S.A., Inc. IP Division

(57) ABSTRACT

The image processing method includes a step of acquiring an image generated by image pickup through an optical system, and a step of performing image restoration processing on the image using an image restoration filter created such that its filter values have a two-dimensional distribution based on aberration information of the optical system. The image restoration filter is a filter in which a position of a cell having a maximum absolute value among the filter values is shifted with respect to a position of a center cell of the image restoration filter by a shift amount according to one of an amount of distortion of the optical system and an amount of chromatic aberration of magnification of the optical system, and which reduces a blur component of the image and at least one of a component of distortion and a component of chromatic aberration of magnification of the image.

16 Claims, 11 Drawing Sheets

IMAGE PROCESSING APPARATUS AND IMAGE PROCESSING METHOD FOR PERFORMING IMAGE RESTORATION USING RESTORATION FILTER

BACKGROUND OF THE INVENTION

Field of the Invention

The present invention relates to an image processing technology for reducing a blur component and a distortion component or a component of chromatic aberration of magnification (hereinafter also referred to as "magnification chromatic aberration component") contained in an image.

An image acquired by capturing an image of an object through an image pickup apparatus such as a digital camera contains a blur component which is an image deterioration component caused by spherical aberration, comatic aberration, field curvature, astigmatism or the like of an image taking optical system (hereinafter simply referred to as "optical system"). Such a blur component is generated because a light flux emitted from one point of the object forms an image with some divergence on an image pickup surface, the light flux being normally converged at one point when there is no aberration or diffraction.

Such a blur component is optically represented by a point spread function (PSF), and different from a blur caused by defocusing. A color blur in a color image caused by longitudinal chromatic aberration, chromatic spherical aberration, or chromatic comatic aberration of the optical system can be said to be a difference between blurring degrees of respective wavelengths of light.

As a method for correcting a blur component of an image, there is known a correction method which uses information of an optical transfer function (OTF) of an optical system. This method is referred to as "image restoration". Hereinafter, processing for correcting (reducing) a blur component of an image by using the information of the optical transfer function (OTF) of the optical system is referred to as "image restoration processing".

The outline of the image restoration processing is as follows.

When g(x, y) represents a deteriorated image (input image) containing a blur component, f(x, y) represents an original non-deteriorated image, h(x, y) represents a point spread function (PSF) which is a Fourier pair of an optical transfer function, * represents convolution, and (x, y) represents coordinates on an image, the following expression is established:

$$g(x,y)=h(x,y)*f(x,y).$$

When converting the above expression into a form of a two-dimensional frequency surface through Fourier transformation, the expression is presented as follows, which takes a form of a product for each frequency:

$$G(u,V)=H(u,v)\cdot F(u,v)$$

where H indicates a result of Fourier transformation of the point spread function (PSF), in other words, an optical transfer function (OTF), and (u, v) indicates coordinates on the two-dimensional frequency surface, in other words, a frequency.

In order to acquire the original image from the deteriorated image, both sides of the expression only need to be divided by H as below:

$$G(u,v)/H(u,v)=F(u,v).$$

Returning the F(u, v) through inverse Fourier transformation to a real surface enables acquisition of a restored image equivalent to the original image f(x, y).

When R represents a result of inverse Fourier transformation of $H^{-1}$, performing convolution processing for an image in the real surface as represented by the following expression similarly enables acquisition of the original image:

$$g(x,y)*R(x,y)=f(x,y).$$

R(x, y) in the expression is referred to as "image restoration filter". A real image contains a noise component, and hence use of an image restoration filter created by taking a completely inverse number of the optical transfer function (OTF) as described above results in amplification of the noise component together with the deteriorated image. Therefore, generally, a good image cannot be acquired. In this regard, there is known a method such as use of a Wiener filter for suppressing a high frequency side restoration rate of an image according to an intensity ratio of an image signal to a noise signal. Deterioration of a color blur component of an image is substantially corrected by, for example, causing blur amounts of respective color components to be uniform by the blur component correction.

The optical transfer function (OTF) fluctuates according to conditions of the optical system such as a focal length (zoom state) and an aperture diameter, and hence the image restoration filter used for image restoration processing needs to be changed.

Further, an image may contain a distortion component. The distortion is generally geometric distortion in which expansion or contraction of a peripheral part of the image is greater and which is caused by distortion aberration of an optical system.

Moreover, an image may contain a color shear component (magnification chromatic aberration component). The color shear component is caused by chromatic aberration of magnification of the optical system.

Japanese Patent Laid-Open No. 2006-270918 discloses a method for correcting geometric distortion of an image caused by distortion aberration. The method corrects the geometric distortion by obtaining information on image pickup conditions such as a zoom state and an object distance at image pickup, and using data corresponding to the obtained image pickup condition information read from distortion aberration data prepared beforehand. The distortion aberration data is a function based on an image height.

An image processing method disclosed in Japanese Patent Laid-Open No. 06-113309 corrects a color shear component caused by chromatic aberration of magnification, which is a difference in magnification between color components, by separating an image obtained by image pickup into plural color components of R, G and B, and performing scaling of the R and B images based on the G image to match the G image.

In order to obtain a high-quality image by properly correcting an image deteriorated by various aberrations of the optical system, processing for reducing the blur component and the distortion component or the magnification chromatic aberration component needs to be performed. In software for executing the processing or an image pickup apparatus which includes the software, however, a high processing speed needs to be achieved to prevent stress on a user.

The correction method disclosed in Japanese Patent Laid-Open No. 2006-270918 cannot reduce the blur component of the image while it can reduce the distortion component of the image by using the distortion aberration data corresponding to the image pickup conditions. Sequentially executing the correction method of the distortion aberration disclosed in Japanese Patent Laid-Open No. 2006-270918 and a conventional image restoration processing using an image restoration filter enables reduction of both of the distortion and blur components. However, the number of processing steps is increased to lower the processing speed.

Further, in the image processing method disclosed in Japanese Patent Laid-Open No. 06-113309, performing the scaling of the respective color components of R, G and B may enable a certain level of correction of a color shear component generated due to chromatic aberration of magnification caused by a difference in image pickup magnification for the respective colors of the optical system. However, when an optical consideration is made of a cause of the color shear component in a real image, the method cannot provide a satisfactory correction effect.

An optical system forms an image by refracting light entering from an object through a lens. In this case, a refractive index of the lens varies from one color (wavelength) to another, and hence a difference is generated in focal length between colors. The optical system is generally designed to suppress chromatic aberration by using plural lenses whose wavelength dispersion and shape are considered. However, requirements of miniaturization of the optical system and cost reduction leave chromatic aberration to a certain extent.

On the other hand, an image pickup system that includes an image pickup element for photoelectrically converting an object image separates the object image into R, G and B signals through color filters, and forms a color image by combing these R, G and B signals. Thus, a signal value of a channel of each of the R, G, and B signals is intensity information obtained by integrating, according to spectral transmittance characteristics of the color filters, lights of wavelengths of 400 nm to 700 nm reaching an image pickup surface. Therefore, even in the G signal, wavelength lights different in focal length in a transmissive wavelength bandwidth according to the spectral transmittance characteristics of the G color filter are accordingly integrated. This condition similarly applies to the R and B signals.

In other words, the chromatic aberration of magnification causes shifting of image-forming positions of the R, G and B channel image, and also blurs each channel image. Thus, the image processing method disclosed in Japanese Patent Laid-Open No. 06-113309 cannot satisfactorily correct the color shear component even when the positional shifting among the R, G, and B signals is corrected by geometric conversion. Moreover, the image processing method disclosed in Japanese Patent Laid-Open No. 06-113309 cannot correct blur components (including color blur component) other than the color shear component.

Sequentially executing the correction method of the color shear component disclosed in Japanese Patent Laid-Open No. 06-113309 and the conventional image restoration processing using the image restoration filter enables reduction of both of the color shear component and the blur component. However, the number of processing steps is increased to lower the processing speed.

SUMMARY OF THE INVENTION

The present invention provides an image processing method, an image processing apparatus and an image pickup apparatus each of which is capable of performing high-speed correction processing for correcting a blur component and a distortion component or a magnification chromatic aberration component in an image.

The present invention provides as one aspect thereof an image processing method for processing an image generated by image pickup using an optical system. The method includes a step of acquiring the image, and a step of performing image restoration processing on the image using an image restoration filter created such that its filter values have a two-dimensional distribution based on aberration information of the optical system. The image restoration filter is a filter in which a position of a cell having a maximum absolute value among the filter values is shifted with respect to a position of a center cell of the image restoration filter by a shift amount according to one of an amount of distortion of the optical system and an amount of chromatic aberration of magnification of the optical system, and which reduces a blur component of the image and at least one of a component of distortion and a component of chromatic aberration of magnification of the image.

The present invention provides as another aspect thereof an image processing apparatus processing an image generated by image pickup using an optical system. The apparatus includes a memory part configured to store an image restoration filter created such that its filter values have a two-dimensional distribution based on aberration information of the optical system, and an image restoring part configured to perform image restoration processing on the image using the image restoration filter. The image restoration filter is a filter in which a position of a cell having a maximum absolute value among the filter values is shifted with respect to a position of a center cell of the image restoration filter by a shift amount according to one of an amount of distortion of the optical system and an amount of chromatic aberration of magnification of the optical system, and which reduces a blur component of the image and at least one of a component of distortion and a component of chromatic aberration of magnification of the image.

The present invention provides as still another aspect thereof an image pickup apparatus including an image pickup system configured to photoelectrically convert an object image formed by an optical system to generate an image, and the above-described image processing apparatus.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1:
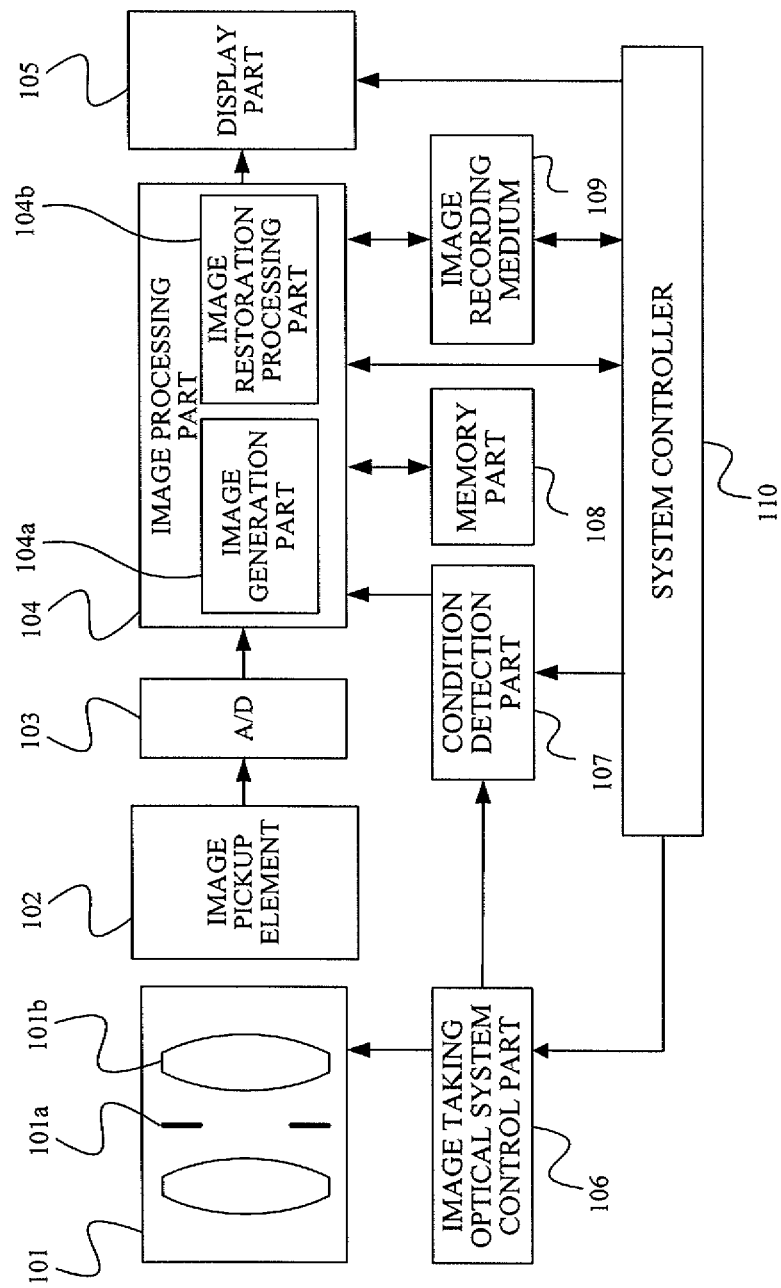
FIG. 1 is a block diagram showing a configuration of an image pickup apparatus which is Embodiment 1 of the present invention.

FIG. 1 shows a configuration of an image pickup apparatus such as a digital still camera or a video camera including an image processing apparatus, in other words, using an image processing method, which is a first embodiment (Embodiment 1) of the present invention.

A light flux from an object (not shown) passes through an image taking optical system 101 to form an object image on an image pickup element 102 constituted by a CCD sensor, a CMOS sensor or the like.

The image taking optical system 101 includes a magnification varying lens (not shown), an aperture stop 101a, and a focus lens 101b. Moving the magnification varying lens in an optical axis direction enables zooming for changing a focal length of the image taking optical system 101. The aperture stop 101a adjusts an amount of light reaching the image pickup element 102 by increasing/decreasing its aperture diameter. Focusing according to an object distance is performed by controlling a position of the focus lens 101b in the optical axis direction by an auto-focus (AF) mechanism or a manual focus mechanism (not shown).

The object image formed on the image pickup element 102 is converted into an electric signal by the image pickup element 102. An analog output signal from the image pickup element 102 is converted into a digital image pickup signal by an A/D converter 103 to be input to an image processing part 104.

The image processing part 104 includes an image generation part 104a which performs various processing on the input digital image pickup signal to generate a color input image. The image processing part 104 includes an image restoration processing part (image restoring part) 104b which performs image restoration processing on the input image. A system from the image pickup element 102 to the image generation part 104a constitutes an image pickup system.

The image restoration processing part 104b acquires information on a condition of the image taking optical system 101 (the condition is hereinafter referred to as "image pickup condition") from a condition detection part 107. The image pickup condition includes, for example, the focal length (zoom position) of the image taking optical system 101, the aperture diameter (aperture value or F-number) of the aperture stop 101a and a focus lens position (object distance). The condition detection part 107 may acquire the information on the image pickup condition from a system controller 110 or an image taking optical system control part 106 for controlling the image taking optical system 101.

The image restoration processing part 104b selects an image restoration filter from a memory part 108 according to the image pickup condition to perform image restoration processing on the input image. The condition detection part 107, the image restoration processing part 104b and the memory part 108 constitute the image processing apparatus in the image pickup apparatus.

Figure 2:
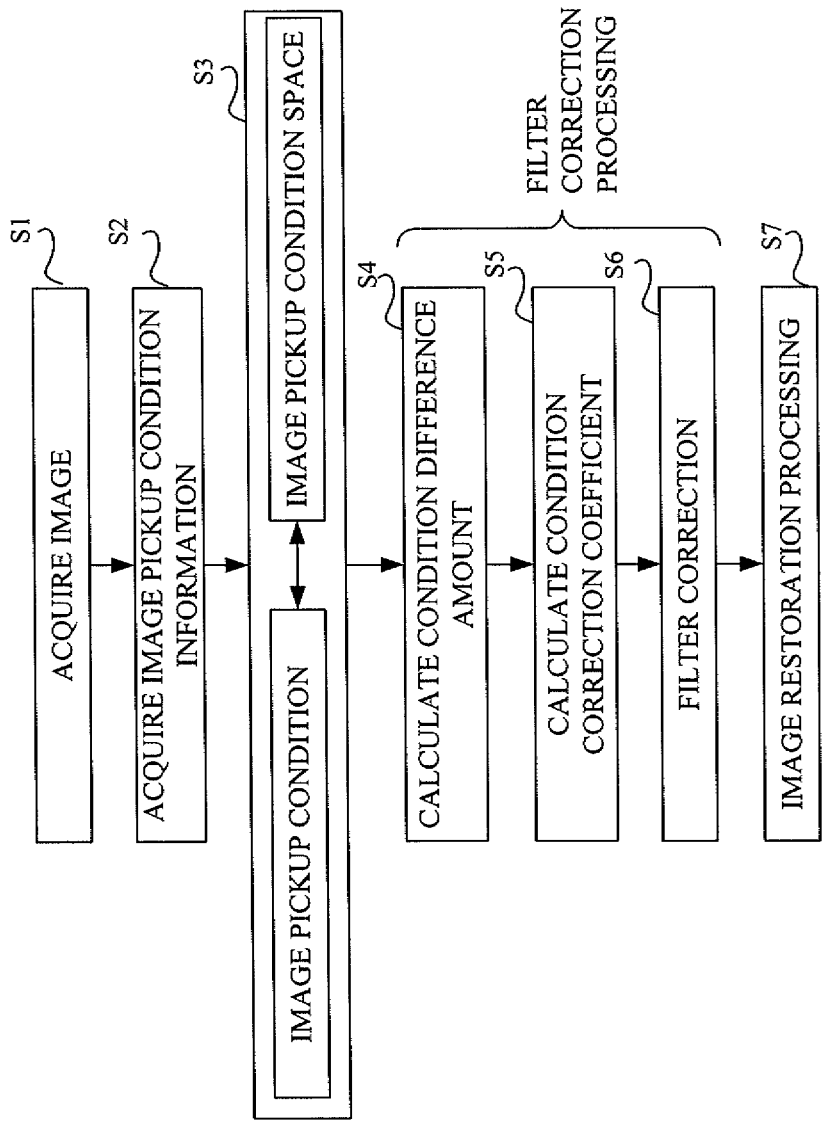
FIG. 2 is a flowchart showing processing performed in the image pickup apparatus of Embodiment 1.

FIG. 2 shows a flowchart of processing (image processing method) relating to image restoration performed by the image restoration processing part 104b. In the following description, the image restoration processing part 104b is referred to as "image processing part 104". The image processing part 104 is constituted by an image processing computer, and performs the processing according to a computer program.

At Step S1, the image processing part 104 acquires, as a target of the image restoration processing, an input image generated based on the output signal from the image pickup element 102.

At Step S2, the image processing part 104 acquires information of the image pickup condition (hereinafter also referred to as "image pickup condition information") from the condition detection part 107. In this embodiment, the image pickup condition includes the zoom position, the aperture diameter and the object distance.

At Step S3, the image processing part 104 selects an image restoration filter corresponding to the image pickup condition acquired at Step S2 among plural image restoration filters stored in the memory part 108.

The memory part 108 stores only image restoration filters corresponding to discretely selected image pickup conditions so as to reduce the number of the image restoration filters (number of data). Thus, if there is stored no image restoration filter in the memory part 108 corresponding to the image pickup condition acquired at Step S2 or to an image pickup condition quite similar to the acquired image pickup condition, the image processing part 104 selects an image restoration filter as similar as possible to the acquired image pickup condition. At subsequent Steps S4 to S6, the image processing part 104 corrects the image restoration filter so as to be optimized to the image pickup condition acquired at Step S2, thereby creating an image restoration filter to be actually used.

Figure 3:
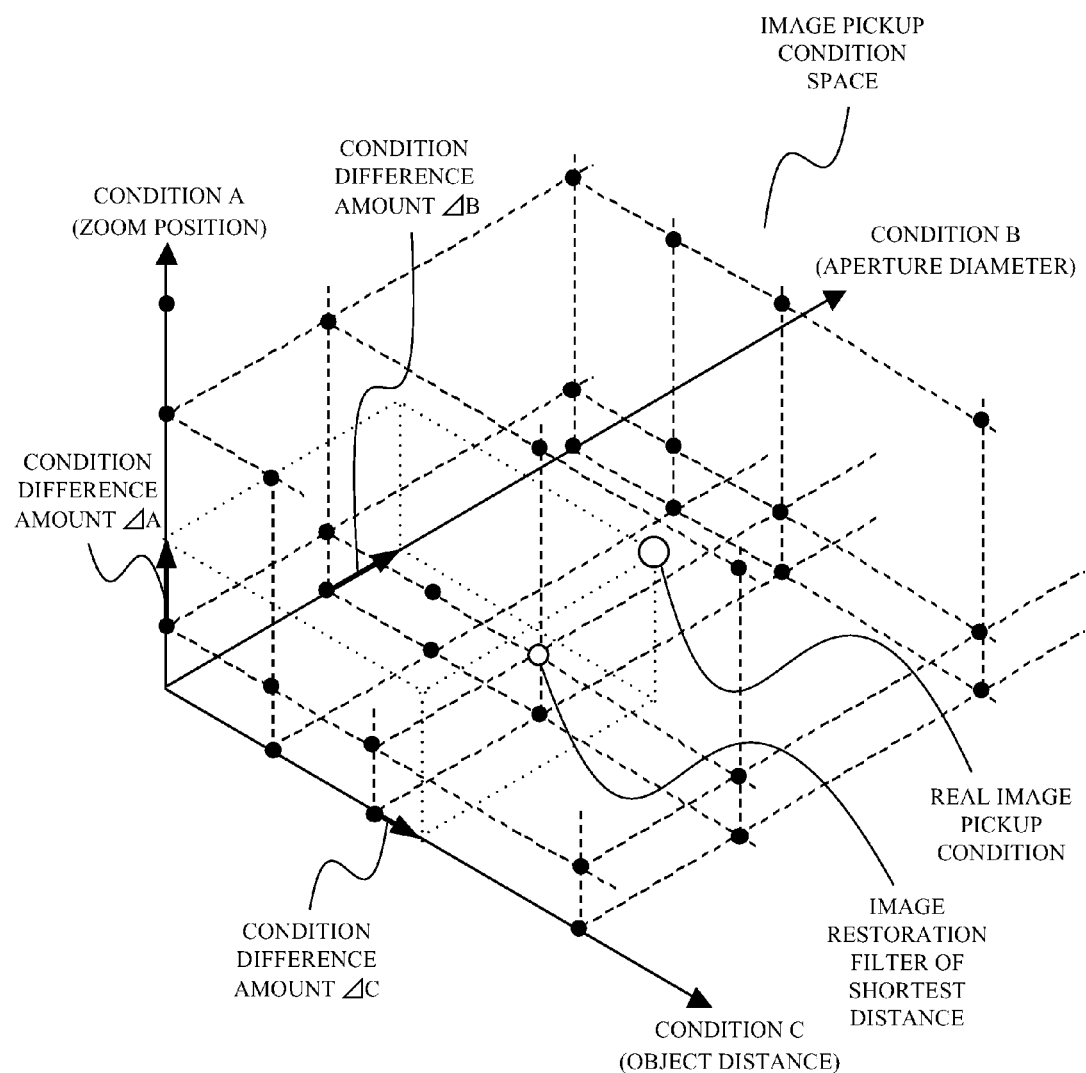
FIG. 3 is a schematic diagram of an image pickup condition space for disposing an image restoration filter stored in a memory part in Embodiment 1.

FIG. 3 schematically shows the image restoration filters stored in the memory part 108 corresponding to the discretely selected image pickup conditions. As described above, the image restoration filters stored in the memory part 108 are discretely arranged in an image pickup condition space having three image pickup condition axes which are an axis of the zoom position (condition A), an axis of the aperture diameter (condition B) and an axis of the object distance (condition C). Coordinates of respective points (shown by black circles) in the image pickup condition space indicate the image restoration filters stored in the memory part 108.

In FIG. 3, the image restoration filters are arranged at lattice points on lines orthogonal to the respective image pickup condition axes. However, the image restoration filter may be arranged off the lattice point. Further, the image pickup condition may include a parameter other than the zoom position, the aperture diameter and the object distance, or the number of the parameters of the image pickup condition is not limited to three. That is, a four or more dimensional image pickup condition space based on four or more parameters of the image pickup condition may be provided to discretely arrange image restoration filters therein.

A method for creating the image restoration filter to be actually used from such discretely arranged image restoration filters will be described below.

Figure 4:
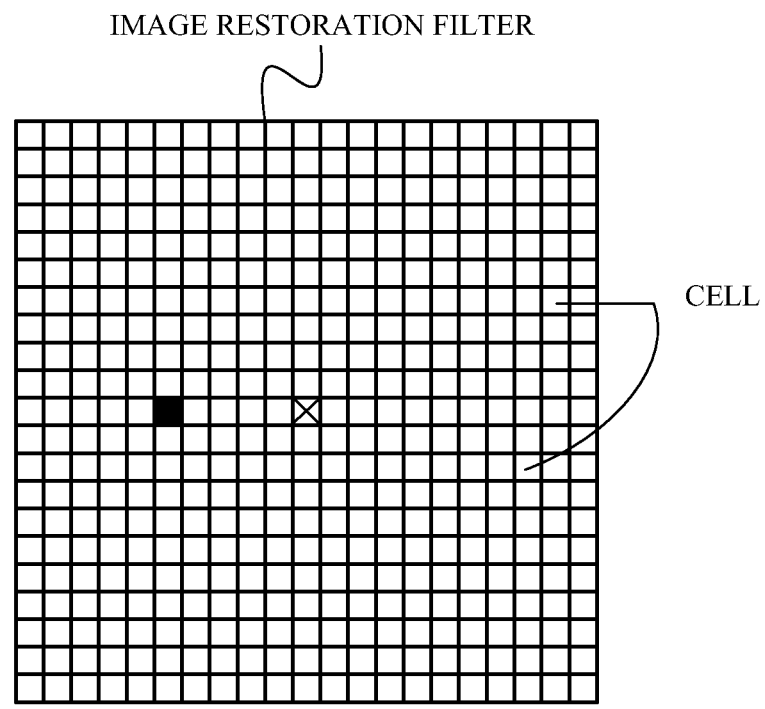
FIG. 4 shows the image restoration filter used in the image pickup apparatus of Embodiment 1.

FIG. 4 shows an example of the image restoration filter. In the image restoration filter, the number of cells (taps) is determined according to an aberration amount of the image taking optical system 101. The image restoration filter shown in FIG. 4 is a two-dimensional filter which has 21×21 cells. Each cell corresponds to one pixel of one image.

Using an image restoration filter which is a two-dimensional filter including more than 100 divided cells enables acquisition of a good image restoration result even when the image taking optical system 101 has aberration widely diverged from an image-forming position, such as spherical aberration, comatic aberration, longitudinal chromatic aberration or off-axis chromatic flare. Further, performing convolution processing on the input image using such a real space image restoration filter enables image restoration without Fourier transformation.

Figure 5:
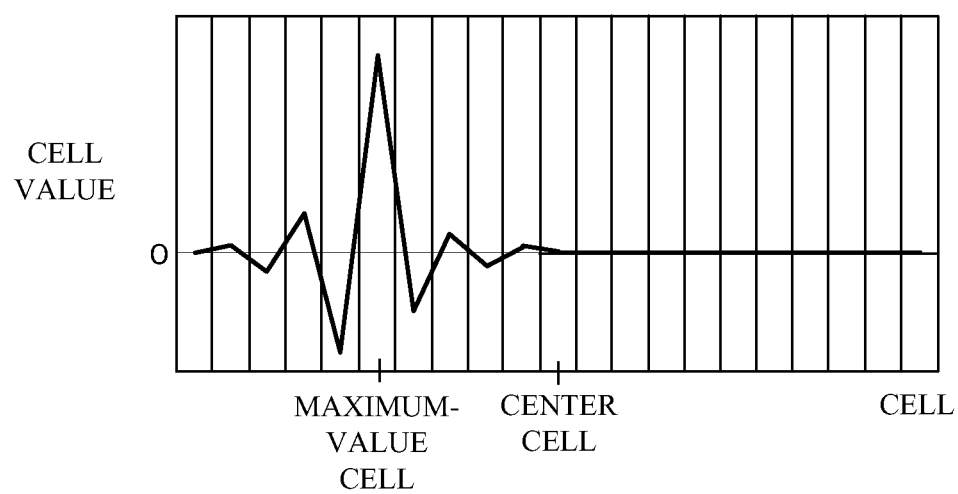
FIG. 5 shows a distribution of cell values of the image restoration filter.

Each cell is set to have a value shown in FIG. 5 based on information on the aberration of the image taking optical system 101 such as the spherical aberration, the comatic aberration, the longitudinal chromatic aberration or the off-axis chromatic flare. FIG. 5 shows cell values (filter values) on one section of the image restoration filter. The image restoration filter is created such that its filter values have a two-dimensional distribution. In the example shown in FIG. 5, the image restoration filter is created so as to restore aberration such as the comatic aberration having asymmetry property at a position shifted from a center of the input image.

The image restoration filter is created by calculating or measuring an optical transfer function (OTF) of the image taking optical system 101, and performing inverse Fourier transformation on an inverse function of the optical transfer function. An influence of noise generally needs to be taken into consideration, and hence methods for creating a Wiener filter or other restoration filters can be selectively used.

The optical transfer function preferably contains not only factors in the image taking optical system 101 but also factors in generation of the input image from the output signal of the image pickup element 102 at the image processing part 104, each factor deteriorating the optical transfer function. In other words, the image restoration filter may be created by performing the inverse Fourier transformation on a function generated based on the inverse function of the optical transfer function from entrance of light into the image taking optical system 101 to acquisition of the input image by image pickup with the image pickup element 102.

Factors that deteriorate the optical transfer function other than those in the image taking optical system 101 are as follows. For example, a low-pass filter (not shown) disposed at the front of the image pickup element 102 suppresses a high-frequency component with respect to frequency characteristics of the optical transfer function. Further, an infrared cut filter similarly disposed at the front of the image pickup element 102 affects a point spread function (PSF) of each of R, G and B channels (especially that of the R channel). Moreover, a shape or an aperture ratio of a pixel aperture of the image pickup element 102 also affects frequency characteristics. Other factors that deteriorate the optical transfer function are spectral characteristics of a light source for illuminating an object, and spectral characteristics of various wavelength filters. Thus, the image restoration filter is preferably created based on an optical transfer function in a broad sense taking the aforementioned factors into consideration.

The image taking optical system 101 may be disposed as part of the image pickup apparatus, or interchangeable for the image pickup apparatus.

When the input image is an RGB color image, it is preferable to create three image restoration filters for color components of R, G and B. This is because the image taking optical system 101 has chromatic aberration, and thereby blurring degrees are different from one color component to another. Therefore, in order to acquire image restoration filters optimal for the respective color components, characteristics thereof should be varied based on the chromatic aberration. In other words, it is preferable to create three image restoration filters for the three color components which have different two-dimensional distributions of the cell values shown in FIG. 5 from each other.

The number of cells (cell arrangement) in longitudinal and lateral directions of the image restoration filter does not need to be in a square arrangement shown in FIG. 4. The number of cells can be arbitrarily changed as long as the cell arrangement is taken into consideration in the convolution processing.

In the example shown in FIG. 5, a position of a cell (hereinafter referred to as "maximum-value cell") having a maximum absolute value among the cell values (filter values) in the image restoration filter is shifted from that of a center cell of the image restoration filter. In FIG. 4, a blackened cell is the maximum-value cell, while a cell indicated by × is the center cell.

Performing the convolution processing on the input image using such an image restoration filter enables reduction (correction) of a blur component by the distribution of the cell values in the filter. Further, since the position of the maximum-value cell is shifted from that of the center cell, the image after the blur component correction is shifted according to a shift amount of the maximum-value cell with respect to the center cell. Setting the shift amount of the maximum-value cell with respect to the center cell based on an amount of distortion (distortion amount) of the image taking optical system 101 enables reduction (correction) of a distortion component contained in the input image. In other words, the image restoration filter of this embodiment is a filter capable of reducing both the blur component and the distortion component which are contained in the input image.

Thus, performing image restoration processing described below using such an image restoration filter enables simultaneous correction of the blur component and the distortion component which are contained in the input image.

A specific selection and creation (correction) method of the image restoration filter will be hereinafter described. In FIG. 3, it is presumed that an image pickup condition indicated by a large white circle is a real image pickup condition acquired at Step S2. When an image restoration filter stored in the memory part 108 (hereinafter referred to as "stored filter") is present at the real image pickup condition or a condition quite similar thereto, this stored filter is selected to be used for the image restoration processing. When no stored filter is present at the real image pickup condition or the condition quite similar thereto, an image restoration filter is selected or created (corrected) by the following method.

At Step S3, the image processing part 104 calculates distances between the real image pickup condition and image pickup conditions corresponding to plural stored filters in the image pickup condition space. The image processing part 104 selects the stored filter corresponding to the image pickup condition having a shortest distance among the calculated distances.

Selection of such a stored filter minimizes a difference amount (hereinafter referred to as "condition difference amount") between the real image pickup condition and the image pickup condition corresponding to the selected stored filter. As a result, a correction amount of the stored filter can be reduced, and an image restoration filter more similar to the image restoration filter corresponding to the real image pickup condition can be created.

In FIG. 3, it is presumed that a stored filter corresponding to an image pickup condition indicated by a small white circle is selected. FIG. 3 conceptually shows the image pickup condition space. However, data of each real stored filter needs information on a coordinate value. Thus, the stored filter may contain coordinate value information, or data of each stored filter may be set in a multidimensional arrangement space in which addresses (coordinates) are predetermined.

Next, at Step S4, the image processing part 104 calculates condition difference amounts ΔA, ΔB and AC between the image pickup condition (A, B and C) corresponding to the stored filter selected at Step S3 and the real image pickup condition. At Step S5, the image processing part 104 calculates condition correction coefficients based on the condition difference amounts ΔA, ΔB and ΔC. At Step S6, the image processing part 104 corrects the stored filter selected at Step S3 using the condition correction coefficients. As a result, an image restoration filter corresponding to the real image pickup condition can be created.

The image restoration filter of this embodiment has, as described above, a blur correction function for reducing the blur component and an image shift function for reducing the distortion component. Thus, in each stored filter, the position of the maximum-value cell is shifted beforehand with respect to that of the center cell.

A filter having only cell value distribution data for correcting the blur component may be prepared as the stored filter, and data of a shift amount of the maximum-value cell for reducing the distortion component may be separately prepared. In this case, in the stored filter prepared in the image pickup condition space, the maximum-value cell has no shift amount (that is, the maximum-value cell matches the center cell), and hence a filter size (number of cells) can be reduced as shown in FIG. 6.

The data of the shift amount of the maximum-value cell in this case may be stored beforehand in the memory part 108. The memory of the data of the shift amount of the maximum-value cell as a function based on an image height in the memory part 108 enables reduction of a capacity necessary for the memory part 108.

Figure 6:
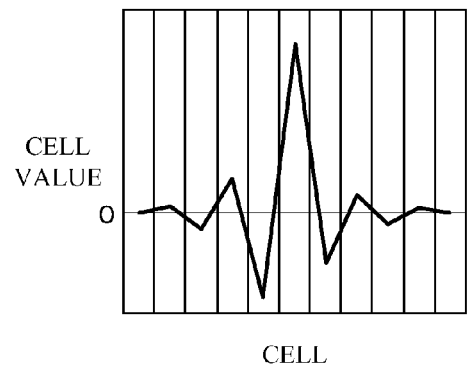
FIG. 6 shows another example of an image restoration filter stored in the memory part in Embodiment 1.

In this case, it is preferable that, at a stage before the image restoration processing actually performed, an image restoration filter similar to that shown in FIG. 5 be created by using the stored filter shown in FIG. 6 and the shift amount data of the maximum-value cell.

Next, at Step S7, the image processing part 104 performs the image restoration processing on the input image acquired at Step S1 using the selected or created image restoration filter. In other words, performing the convolution processing on the input image using the image restoration filter enables reduction or removal of the blur component and the distortion component contained in the input image which are caused by the aberration of the image taking optical system 101.

In this case, as described above, performing the image restoration processing using the image restoration filters for the R, G and B color components having different shift amounts of the maximum-value cell according to the chromatic aberration of magnification enables reduction (correction) of a magnification chromatic aberration component (that is, a color shear component) contained in the input image. Further, performing the image restoration processing using the image restoration filters for the R, G and B color components having different cell value distributions according to the chromatic aberration (chromatic flare) enables reduction (correction) of a color blur component contained in the input image.

The selection and correction processing of the image restoration filter at Steps S2 to S6 may be carried out by an apparatus (personal computer or the like) different from the image pickup apparatus. In such a case, processing for storing (installing) an image restoration filter acquired by the different apparatus into the memory part 108 of the image pickup apparatus may be performed.

Figure 7:
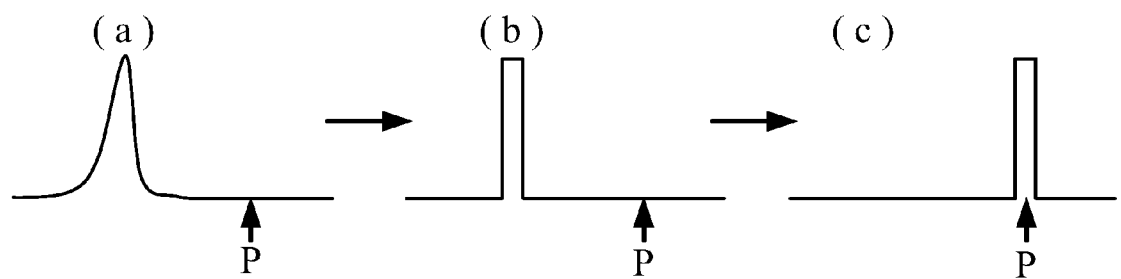
FIG. 7 shows an effect obtained by image restoration processing in Embodiment 1.
Figure 7:
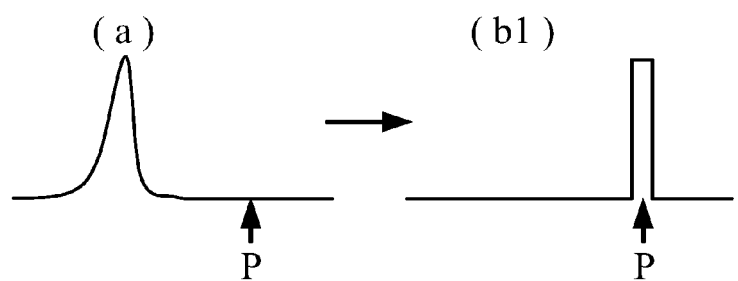

Referring to FIG. 7, an effect obtained by the image restoration processing which uses the image restoration filters of this embodiment will be described. An effect of one color component among the R, G and B color components will be described here. However, when the input image contains a color blur component, the image restoration processing using the image restoration filters of the respective color components may be performed as described above.

In FIG. 7, (a) shows an input image in which an object image normally having a rectangular profile if there is no influence of the aberration of the image taking optical system 101 deteriorates into a blur image due to the aberration of the image taking optical system 101, and the object image is shifted from its original position P due to the distortion of the image taking optical system 101.

In FIG. 7, (b) shows a restored image in a case where image restoration processing is performed on the input image shown in (a) using a conventional image restoration filter having no image shift function. In this restored image, a distortion component is not yet to be corrected while the object image has been corrected to have its original rectangular profile, and hence the object image is still at the shifted position from the original position P.

In FIG. 7, (c) shows an image corrected by performing image shift processing as distortion correction on the restored image shown in (b) so as to correct the distortion component to locate the object image at the original position P.

On the other hand, performing the image restoration processing on the input image shown in (a) using the image restoration filter described in this embodiment which has both the blur correction function and the image shift function corrects the input image such that the object image has its original rectangular profile as shown in (b1). Further, simultaneously therewith, the position of the object image is shifted to the original position P.

As described above, this embodiment can perform the correction processing for the blur component (that is, the image restoration processing) and the correction processing for the distortion component (that is, the image shift processing), which have been separately performed in conventional image processing, in one (single) image restoration processing.

In FIG. 1, the output image on which the image restoration processing at the image processing part 104 has been performed is stored in a predetermined format in an image recording medium 109 such as a semiconductor memory or an optical disk. The output image is a high-quality image sharpened and reduced in distortion component by the image restoration processing.

The output image is displayed by a display part 105 or output to the outside (printer or database) of the image pickup apparatus.

The above-described operations including the photoelectric conversion at the image pickup element 102, the image processing at the image processing part 104, the recording in the image recording medium 109 and the image displaying at the display part 105 are controlled by the system controller 110. Zoom driving and focus driving of the image taking optical system 101 are controlled by the image taking optical system control part 106 based on instructions from the system controller 110.

It is preferable that the image taking optical system 101 be designed such that a lateral magnification of the image taking optical system 101 for a central image height is larger 1.25 times or more than that for a maximum image height. Thereby, a diameter of a front lens of the image taking optical system 101 located nearest to the object can be reduced, or field curvature can be corrected.

Moreover, since the shift amount of the maximum-value cell with respect to the center cell is determined according to the distortion amount of the image taking optical system 101, the size (number of cells) of the image restoration filter may be changed according to the distortion amount.

Figure 8:
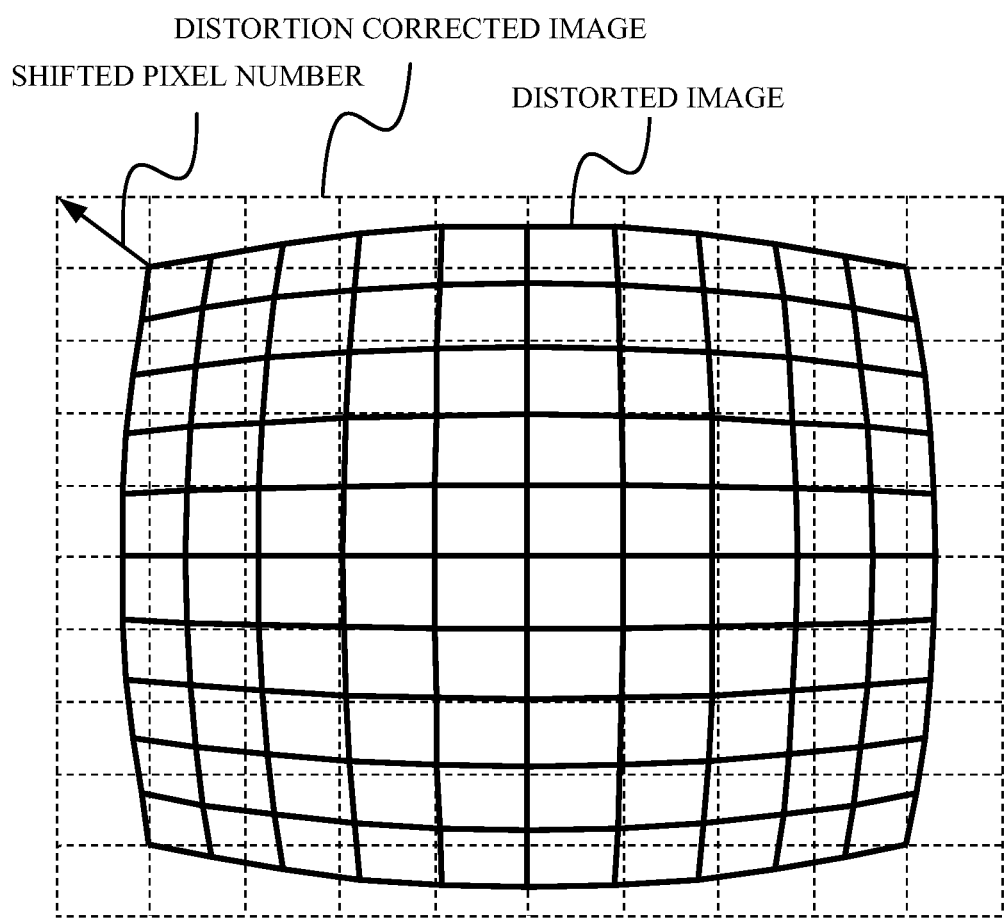
FIG. 8 shows distortion aberration.

FIG. 8 schematically shows by a solid line an input image distorted to have a barrel shape by a distortion component. FIG. 8 also shows a distortion amount of the input image and an image shift amount (shifted pixel number) of a diagonal end of the input image. When the distortion component is corrected, the object image needs to be shifted and enlarged in a peripheral part of the image. Thus, interpolation processing is performed for short pixels.

TABLE 1

| DISTORTION[%] | SHIFTED PIXEL NUMBER |
|---|---|
| −5 | 114 |
| −10 | 228 |
| −15 | 342 |
| −20 | 456 |
| −25 | 571 |

The above-described optical transfer function (OTF) changes according to an angle of view (image height) even in the same image pickup condition. Therefore, it is desirable that the image restoration processing be performed by changing the image restoration filter for each of plural areas divided according to the image height in the input image. In this case, convolution processing may be performed with scanning of the image restoration filter on the input image, and the image restoration filters may be sequentially changed for the respective divided areas.

Moreover, correcting the image restoration filter according to a signal value of a pixel in the input image which is a target of the image restoration processing enables suppression of increase of noise becoming conspicuous in a dark area of the input image. A noise component for an image signal in the dark area of the input image is relatively large as compared with that in a bright area, and thus the image restoration processing may emphasize the noise. Therefore, in the dark area, correcting the respective cell values of the image restoration filter so as to reduce its image restoration effect can suppress the increase of noise. No image restoration processing may be performed for a pixel or a pixel area whose signal value is equal to or less than a threshold value.

Moreover, when there is a correction error in the restored image after the image restoration processing, another image processing may be performed to correct the correction error. The other image processing can further reduce a residual aberration component in the restored image caused by a difference between the real image pickup condition and the image pickup condition corresponding to the image restoration filter used for the image restoration processing.

Furthermore, when there is a brightness saturation area in the input image, an aberration component becomes conspicuous in a peripheral part of the input image. However, in the image restoration processing, an original brightness value may be unknown for a pixel whose brightness value is saturated, disabling good correction. In such a case, detecting a residual aberration component from the restored image after the image restoration processing to perform adaptive correction processing enables achievement of higher image quality. The adaptive correction processing corrects aberration lastly left in the restored image having the blur component and the distortion component reduced by the image restoration processing of this embodiment, so that the adaptive correction processing is preferably performed after the image restoration processing.

Embodiment 2

Description will be next made of a second embodiment (Embodiment 2) of the present invention. An image processing method of this embodiment is also performed in an image pickup apparatus basically identical to the image pickup apparatus shown in FIG. 1 in Embodiment 1. Therefore, components common to or having similar functions to those in Embodiment 1 are denoted by the same reference numerals as those in Embodiment 1. The image processing described in this embodiment may be performed by a personal computer (image processing apparatus).

Figure 9:
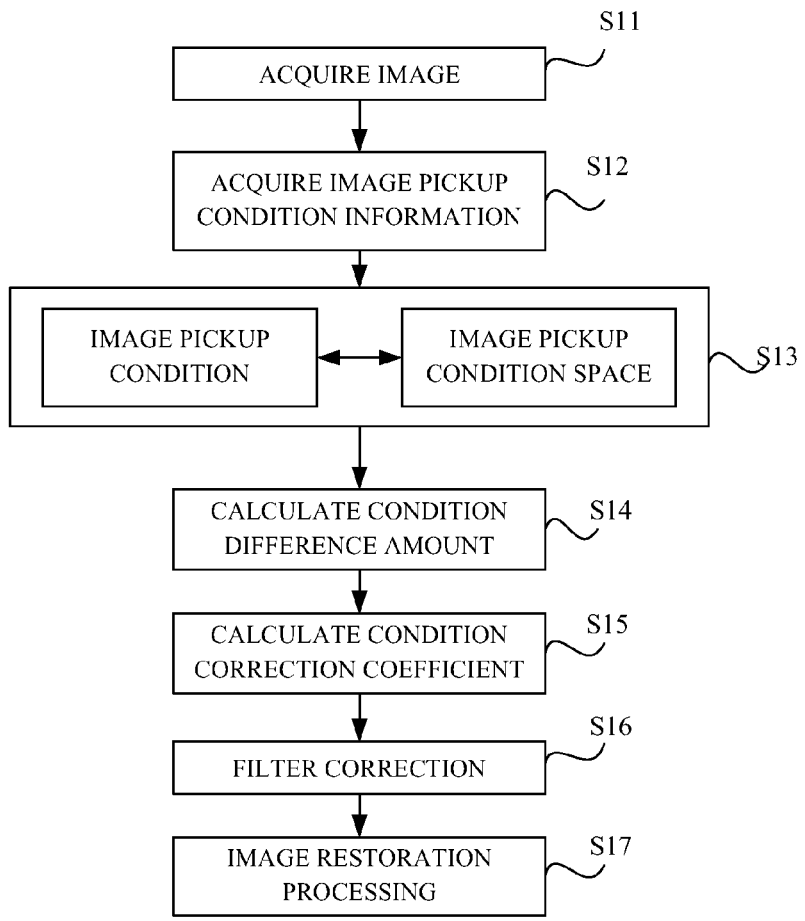
FIG. 9 is a flowchart showing processing performed in an image pickup apparatus which is Embodiment 2 of the present invention.

FIG. 9 shows a flowchart of processing (image processing method) relating to image restoration performed an image restoration processing part 104b (hereinafter referred to as "image processing part 104"). The image processing part 104 is constituted by an image processing computer, and performs the processing according to a computer program.

At Step S11, the image processing part 104 acquires, as a target of the image restoration processing, an input image generated based on the output signal from an image pickup element 102.

At Step S12, the image processing part 104 acquires information on an image pickup condition (image pickup condition information) from a condition detection part 107. In this embodiment, the image pickup condition includes a zoom position, an aperture diameter and an object distance.

At Step S3, the image processing part 104 selects an image restoration filter corresponding to the image pickup condition acquired at Step S12 among plural image restoration filters stored in a memory part 108.

The memory part 108 stores only image restoration filters corresponding to discretely selected image pickup conditions so as to reduce the number of the image restoration filters (number of data). Thus, if there is stored no image restoration filter in the memory part 108 corresponding to the image pickup condition acquired at Step S12 or to an image pickup condition quite similar to the acquired image pickup condition, the image processing part 104 selects an image restoration filter as similar as possible to the acquired image pickup condition. At subsequent Steps S14 to S16, the image processing part 104 corrects the image restoration filter so as to be optimized to the image pickup condition acquired at Step S12, thereby creating an image restoration filter to be actually used.

The image restoration filters stored in the memory part 108 for the discretely selected image pickup conditions are the same as those in Embodiment 1 shown in FIG. 3.

A method for creating the image restoration filter to be actually used from such discretely selected (arranged) image restoration filters will be described below.

Figure 10:
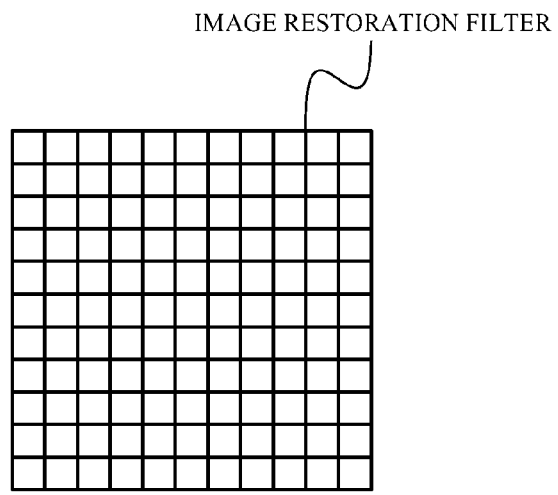
FIG. 10 shows an image restoration filter used in the image pickup apparatus of Embodiment 2.

FIG. 10 shows an example of the image restoration filter. In the image restoration filter, the number of cells (taps) is determined according to an aberration amount of an image taking optical system 101. The image restoration filter shown in FIG. 10 is a two-dimensional filter which has 11×11 cells. Each cell corresponds to one pixel of one image.

Using an image restoration filter which is a two-dimensional filter including more than 100 divided cells enables acquisition of a good image restoration result even when the image taking optical system 101 has aberration widely diverged from an image-forming position, such as spherical aberration, comatic aberration, longitudinal chromatic aberration or off-axis chromatic flare. Further, performing convolution processing on the input image using such a real space image restoration filter enables image restoration without Fourier transformation.

Figure 11:
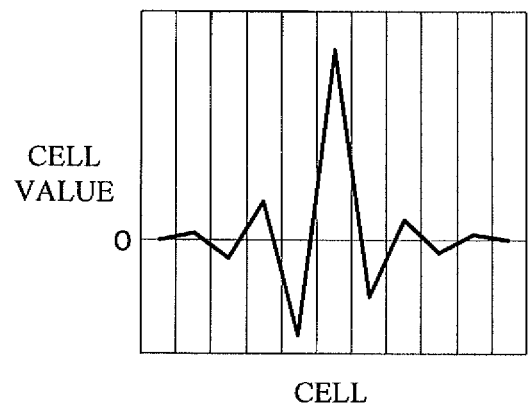
FIG. 11 shows a basic distribution of cell values of the image restoration filter in Embodiment 2.

Each cell is set to have a value shown in FIG. 11 based on information on the aberration of the image taking optical system 101 such as the spherical aberration, the comatic aberration, the longitudinal chromatic aberration or the off-axis chromatic flare. FIG. 11 shows cell values (filter values) on one section of the image restoration filter. The image restoration filter is created such that its filter values have a two-dimensional distribution. In the example shown in FIG. 11, the image restoration filter is created so as to restore aberration such as the comatic aberration having asymmetry property at a position shifted from a center of the input image.

As in the case of Embodiment 1, the image restoration filter is created by calculating or measuring an optical transfer function (OTF) of the image taking optical system 101, and performing inverse Fourier transformation on an inverse function of the optical transfer function. Further, as in the case of Embodiment 1, an influence of noise generally needs to be taken into consideration, and hence methods for creating a Wiener filter or other restoration filters can be selectively used. The image restoration filter is preferably created based on the optical transfer function in a broad sense, and plural (three in this case) image restoration filters are preferably created corresponding to plural color components of R, G and B.

Although FIG. 10 shows the image restoration filter having 11×11 cells, the number of cells of the image restoration filter may be optionally set according to the aberration amount. For example, when the aberration amount is large, the number of cells may be increased to 30×30 or 50×50.

The number of the cells (cell arrangement) in longitudinal and lateral directions of the image restoration filter does not need to be in a square arrangement shown in FIG. 10. The number of cells can be arbitrarily changed as long as the cell arrangement is taken into consideration in the convolution processing.

A specific selection and creation (correction) method of the image restoration filter will be hereinafter described. In FIG. 3, it is presumed that an image pickup condition indicated by a large white circle is a real image pickup condition acquired at Step S12. When an image restoration filter stored in the memory part 108 (hereinafter referred to as "stored filter") is present at the real image pickup condition or a condition quite similar thereto, this stored filter is selected to be used for the image restoration processing. When no stored filter is present at the real image pickup condition or the condition quite similar thereto, an image restoration filter is selected or created (corrected) by the following method.

At Step S13, the image processing part 104 calculates distances between the real image pickup condition and image pickup conditions corresponding to plural stored filters in the image pickup condition space. The image processing part 104 selects the stored filter corresponding to the image pickup condition having a shortest distance among the calculated distances.

Selection of such a stored filter minimizes a difference amount (condition difference amount) between the real image pickup condition and the image pickup condition corresponding to the selected stored filter. As a result, a correction amount of the stored filter can be reduced, and an image restoration filter more similar to the image restoration filter corresponding to the real image pickup condition can be created.

In FIG. 3, it is presumed that a stored filter corresponding to an image pickup condition indicated by a small white circle is selected. FIG. 3 conceptually shows the image pickup condition space. However, data of each real stored filter needs information on a coordinate value. Thus, the stored filter may contain coordinate value information, or data of each stored filter may be set in a multidimensional arrangement space in which addresses (coordinates) are predetermined.

Next, at Step S14, the image processing part 104 calculates condition difference amounts ΔA, ΔB and ΔC between the image pickup condition (A, B and C) corresponding to the stored filter selected at Step S13 and the real image pickup condition. At Step S15, the image processing part 104 calculates condition correction coefficients based on the condition difference amounts ΔA, ΔB and ΔC. At Step S16, the image processing part 104 corrects the stored filter selected at Step S13 using the condition correction coefficients. As a result, an image restoration filter corresponding to the real image pickup condition can be created.

Next, at Step S17, the image processing part 104 performs the image restoration processing on the input image acquired at Step S11 using the selected or created image restoration filter. Performing the convolution processing on the input image using the image restoration filter enables reduction or removal of a blur component (image blur component) and a color blur component contained in the input image, which are caused by the aberration of the image taking optical system 101.

The processing performed at Steps S13 to S17 may be performed by an apparatus (personal computer or the like) different from the image pickup apparatus. In such a case, processing for storing (installing) an image restoration filter acquired by the different apparatus into the memory part 108 of the image pickup apparatus may be performed.

The output image on which the image restoration processing at the image processing part 104 has been performed is stored in a predetermined format in an image recording medium 109 such as a semiconductor memory or an optical disk. The output image is a high-quality image sharpened by the image restoration processing.

The output image is displayed by a display part 105 or output to the outside (printer or database) of the image pickup apparatus.

This embodiment reduces (corrects) by the image restoration processing not only the image blur component and the color blur component of the input image, but also a color shear component. Thus, in order to enable correction of the image blur component, the color blur component and the color shear component, this embodiment selects, as described above, plural (three in this embodiment) image restoration filters for respective color components of R, G and B according to the image pickup condition, or creates them by correcting the selected image restoration filters in the image restoration processing.

Figure 12:
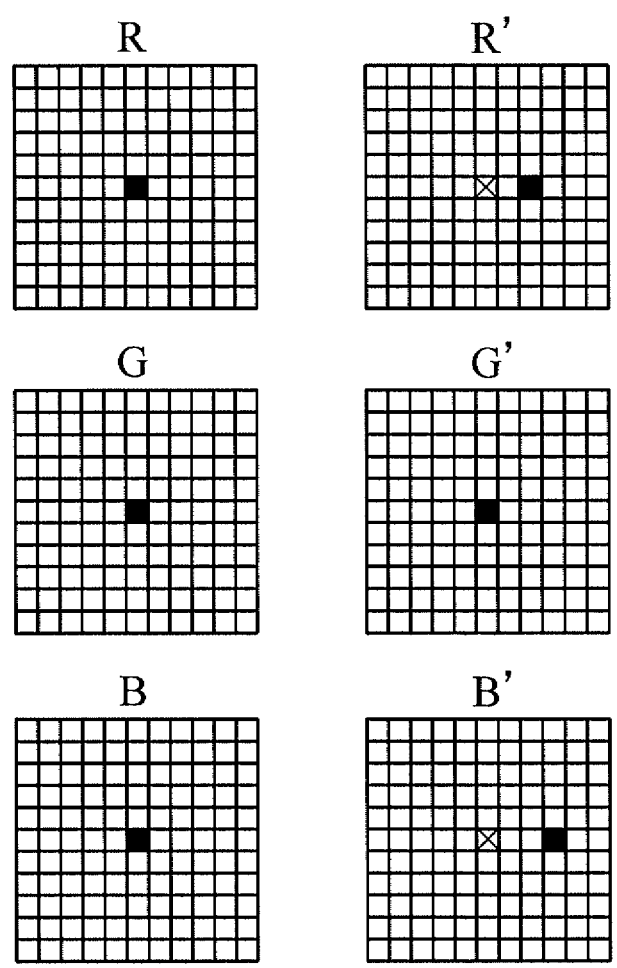
FIG. 12 shows image restoration filters for respective color components used in Embodiment 2.

FIG. 12 shows examples of the image restoration filters for the respective color components. The image restoration filters shown by R, G and B are filters for R, G and B colors, respectively. These image restoration filters are filters for correcting the image blur component and the color blur component, but have no correction function for the color shear component corresponding to the chromatic aberration of magnification.

The image restoration filters shown by R', G' and B' in FIG. 12 are also filters for the R, G and B colors, respectively. Each of these image restoration filters has the correction function for the color shear component in addition to the correction function for the image blur component and the color blur component. Specifically, in at least one (R' and B') of the three image restoration filters, a position of a cell having a maximum absolute value among cell values (filter values), that is, a maximum-value cell is shifted from that of a center cell of the image restoration filter.

In each image restoration filter, a blackened cell is the maximum-value cell, and a cell indicated by × is the center cell.

The image restoration filters shown by R, G and B in FIG. 12 are different from each other in filter characteristics due to differences in optical transfer function (OTF) for the respective color components. However, the positions of the maximum-value cells of the image restoration filters are the same (identical to the positions of the center cells).

Figure 13:
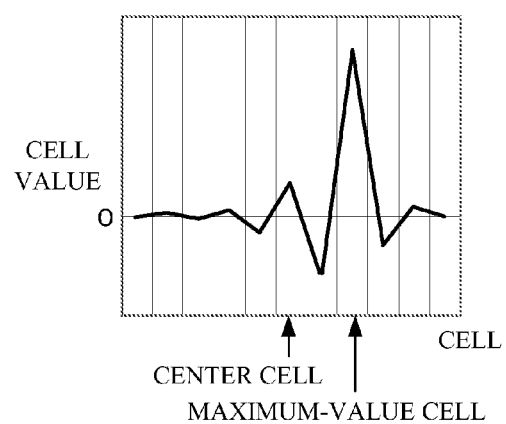
FIG. 13 shows a distribution of cell values of each of the image restoration filters shown in FIGS. 12R to 12B'.

The image restoration filters shown by R', G' and B' are different from each other in shift amount of the position of the maximum-value cell with respect to that of the center cell in addition to the difference in filter characteristics. Relative shift amounts of the positions of the maximum-value cells among the image restoration filters (R', G' and B') correspond to an amount of the chromatic aberration of magnification of the image taking optical system 101. FIG. 13 shows the cell values (filter values) in one section of the image restoration filter shown by R' in FIG. 12.

Making the cell value distributions of the image restoration filters shown by R', G' and B' for the respective color components different from each other enables correction of the image blur component and the color blur component in the respective colors. Further, making positions of the cell value distributions of the image restoration filters shown by R', G' and B' different from each other (that is, making the shift amounts between the position of the maximum-value cell and that of the center cell in the image restoration filters different from each other [however, the shift amount in G' is 0 in this embodiment]) enables correction of the color shear component.

If the cell value distribution of the image restoration filter protrudes from the original cell area when the cell value distribution is moved, it is preferable to increase the number of cells of the image restoration filter.

Figure 14:
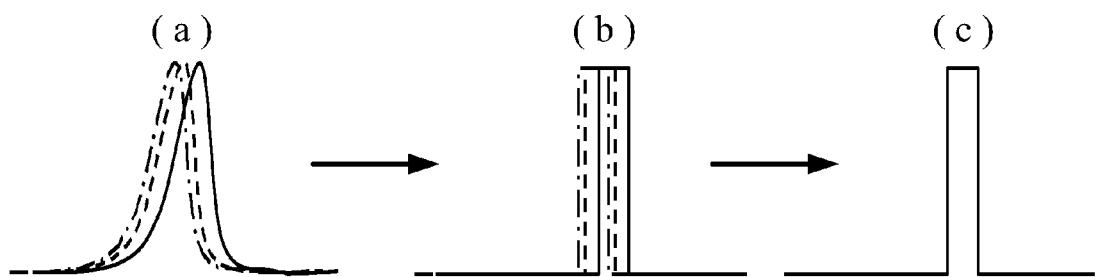
FIG. 14 shows an effect obtained by image restoration processing in Embodiment 2.
Figure 14:
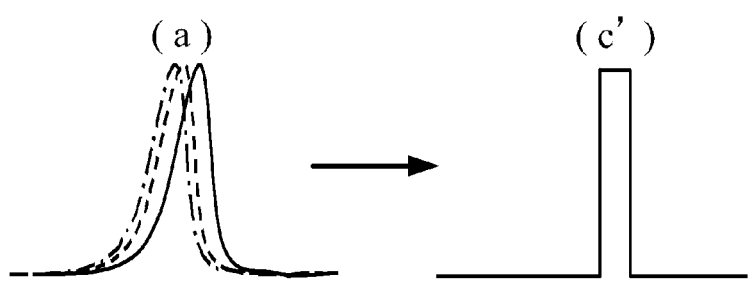

Next, referring to FIG. 14, an effect obtained by the image restoration processing using the image restoration filters shown by R', G' and B' in FIG. 12 will be described. In FIG. 14, (a) shows an input image in which object images of R, G and B normally having a rectangular profile if there is no influence of the aberration of the image taking optical system 101 deteriorate into blur images due to the aberration of the image taking optical system 101.

A solid line, a broken line and a chain line respectively indicate a G component, an R component, and a B component. In (a), the G component, the R component and B component are different from each other in blur spreading, and in peak position. Deterioration of a profile of each color component corresponds to the image blur component, coloring caused by differences in blur amount among the color components corresponds to the color blur component, and shifting of the peak positions corresponds to the color shear component.

In FIG. 14, (b) shows a restored image in the case where the image restoration processing is performed on the input image shown in (a) by using the image restoration filters shown by R, G and B in FIG. 12. In the restored image, the color shear component is yet to be corrected while the blur component (including the color blur component) has been corrected such that object images of R, G and B have their original rectangular profile. Performing Scaling of the respective color images can correct color shearing to obtain an image shown in (c).

On the other hand, the image restoration processing on the input image shown in (a) using the image restoration filters shown by R', G' and B' simultaneously corrects, as shown in (c'), the blur component (including the color blur component) in each color component and the color shear component.

As described above, this embodiment can perform correction processing for the blur component (that is, the image restoration processing) and correction processing for the color shear component, which have been separately performed in conventional image processing, in one (single) image restoration processing. Therefore, the blur component and the color shear component (magnification chromatic aberration component) can be reduced by high-speed processing, and a good output image can be acquired.

As in Embodiment 1, it is desirable that the image restoration processing be performed by changing the image restoration filter for each of plural areas divided according to an image height in the input image. In this case, convolution processing may be performed with scanning of the image restoration filter on the input image, and the image restoration filters may be sequentially changed for the respective divided areas.

Moreover, also in this embodiment, correcting the image restoration filter according to a signal value of a pixel in the input image which is a target of the image restoration processing enables suppression of increase of noise becoming conspicuous in a dark area of the input image. No image restoration processing may be performed for a pixel or a pixel area whose signal value is equal to or less than a threshold value.

Furthermore, when there is a correction error in the restored image after the image restoration processing, another image processing may be performed to correct the correction error.

Processing performed when there is a brightness saturation area in the input image in this embodiment is similar to that in Embodiment 1.

Each of the above embodiments has been described the case where the input image is an RGB color image. However, the present invention can be applied to other color images such as a YCC color image.

Further, each of the above embodiments has been described the image pickup apparatus using the image processing method (that is, equipped with the image processing apparatus). However, the image processing method can be implemented by an image processing program installed in a personal computer. In this case, the personal computer corresponds to the image processing apparatus of the present invention. The personal computer takes in (acquires) an image (input image) generated by the image pickup apparatus and yet to be subjected to the image restoration processing, and performs the image restoration processing according to the image processing program to output a resulting image.

Embodiment 3

Description will be next made of a third embodiment (Embodiment 3) of the present invention. An image processing method of this embodiment is also performed in an image pickup apparatus basically identical to the image pickup apparatus shown in FIG. 1 in Embodiment 1. Therefore, components common to or having similar functions to those in Embodiment 1 are denoted by the same reference numerals as those in Embodiment 1. The image processing described in this embodiment may be performed by a personal computer (image processing apparatus).

This embodiment will describe a case where image restoration processing corrects not only the blur component and the distortion component of the input image described in Embodiment 1, but also the color shear component thereof described in Embodiment 2. The color shear component of the input image is generated due to chromatic aberration of magnification of an image taking optical system 101, in other words, due to differences in image-forming magnification among color components. The aforementioned color blur component is a result of differences in blurring degree among the color components, so that it can be included in the blur component in a broad sense. Thus, the color blur component is separated from the color shear component which is a correction target in this embodiment.

Figure 15:
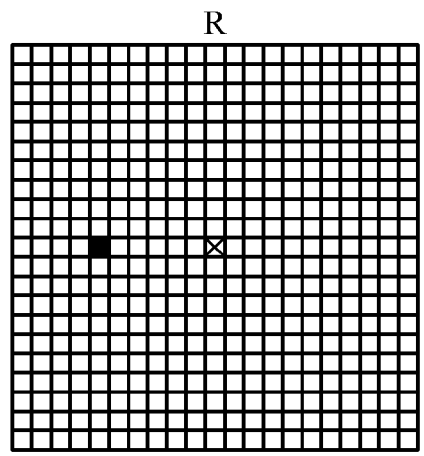
FIG. 15 shows image restoration filters used in Embodiment 3 of the present invention.
Figure 15:
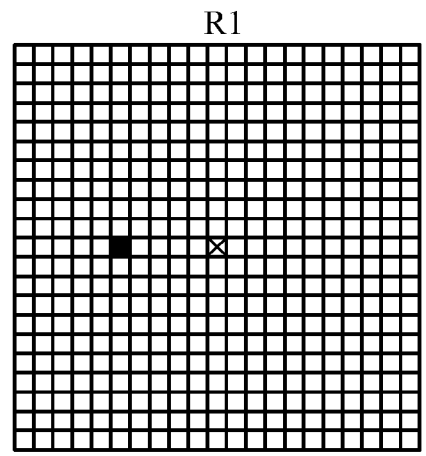
Figure 15:
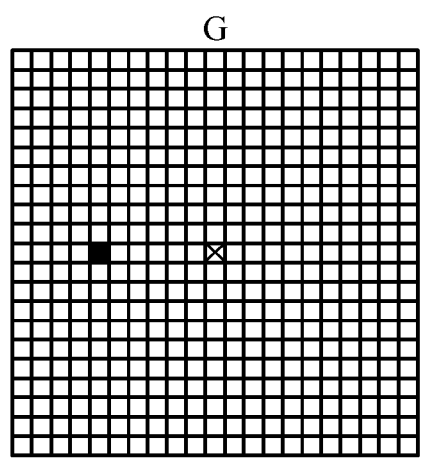
Figure 15:
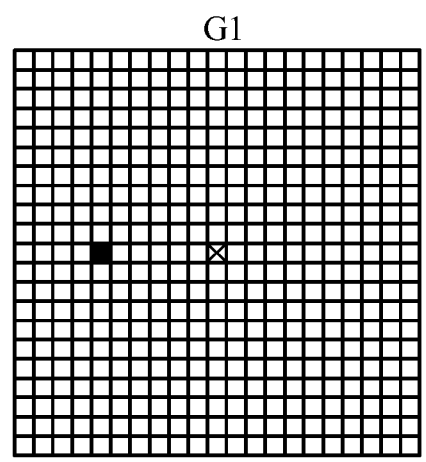
Figure 15:
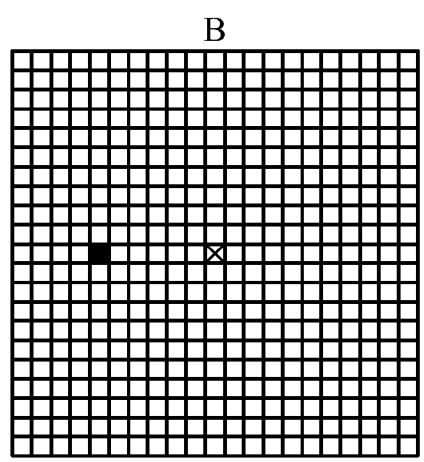
Figure 15:
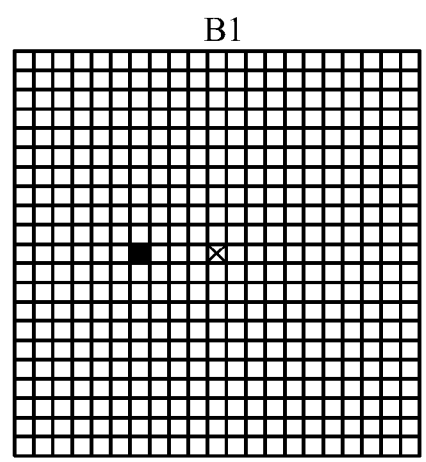

FIG. 15 shows examples of image restoration filters for the respective color components. The image restoration filters shown by R, G and B in FIG. 15 are filters for R, G and B colors, respectively. These image restoration filters are, as described in Embodiment 1, filters for correcting the blur component and the distortion component, but have no correction function for the color shear component corresponding to the chromatic aberration of magnification.

The image restoration filters shown by R1, G1 and B1 in FIG. 15 are also filters for the R, G and B colors, respectively. Each of these image restoration filters has the correction function for the color shear component in addition to the correction function for the blur component and the distortion component.

In each image restoration filter, a blackened cell is a maximum-value cell having a maximum absolute value among cell values (filter values), and a cell indicated by × is a center cell.

The image restoration filters shown by R, G and B are different from each other in filter characteristics due to differences in optical transfer function (OTF) for the respective color components. However, positions of the maximum-value cells (shift amounts of the positions of the maximum-value cells with respect to those of the center cells) of the image restoration filters are the same.

The image restoration filters shown by R1, G1 and B1 are different from each other in position of the maximum-value cell (in shift amount of the position of the maximum-value cell with respect to that of the center cell) in addition to the difference in filter characteristics. Relative shift amounts of the positions of the maximum-value cells among the image restoration filters (R1, G1 and B1) correspond to an amount of the chromatic aberration of magnification of the image taking optical system 101. More specifically, the shift amounts of the positions of the maximum-value cells with respect to those of the center cells in the image restoration filters (R1, G1 and B1) for the respective color components are set to values according to a distortion amount depending on an image height and the amount of the chromatic aberration of magnification.

Although FIG. 15 shows the image restoration filter having 21×21 cells, the number of cells of the image restoration filter may be increased to, for example, 50×50 or 100×100 when the aberration amount is large.

Making the cell value distributions of the image restoration filters shown by R1, G1 and B1 for the respective color components different from each other enables correction of the blur component in each color (that is, the color blur component). Further, making positions of the cell value distributions of the image restoration filters different from each other (that is, making the shift amounts between the position of the maximum-value cell and that of the center cell in the image restoration filters different from each other enables correction of the distortion component and the color shear component.

Figure 16:
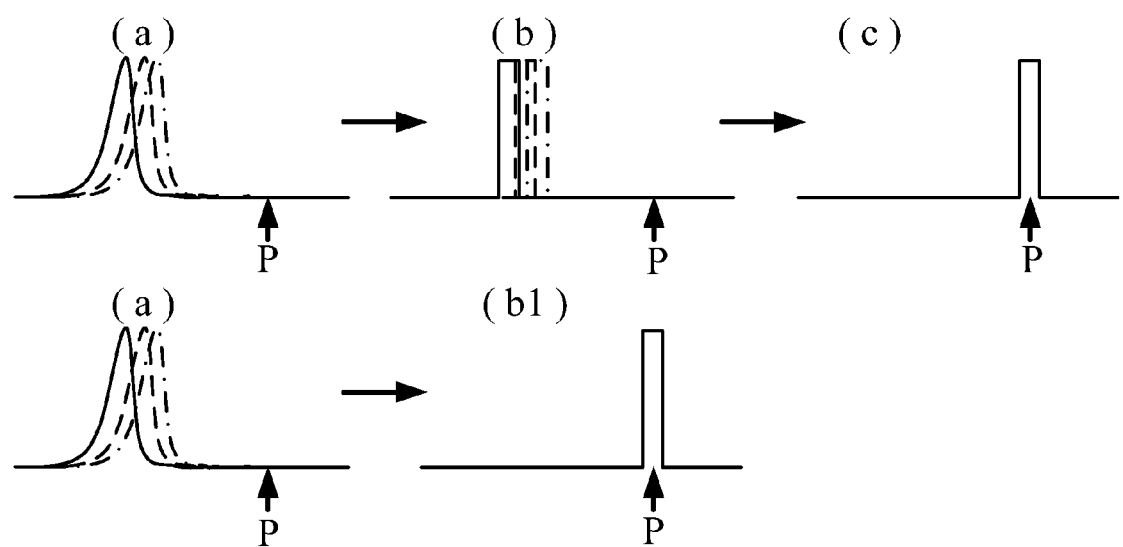
FIG. 16 shows an effect obtained by image restoration processing in the Embodiment 3.

Next, referring to FIG. 16, an effect obtained by the image restoration processing using the image restoration filters shown by R1, G1 and B1 in FIG. 15 will be described. In FIG. 16, (a) shows an input image in which object images of R, G and B normally having a rectangular profile if there is no influence of aberration of the image taking optical system 101 deteriorate into blur images due to the aberration of the image taking optical system 101, and the object images are shifted from their original position P due to distortion of the image taking optical system 101.

A solid line, a broken line and a chain line respectively indicate a G component, an R component, and a B component. In (a), color shearing is generated between R, G and B due to the chromatic aberration of magnification.

In FIG. 16, (b) shows a restored image in a case where image restoration processing is performed on the input image shown in (a) using conventional image restoration filters having no image shift function. In this restored image, the distortion component and the color shear component is not yet to be corrected while the object images of R, G, and B have been corrected to have their original rectangular profile, and hence the object images are still at the shifted positions from the original position P.

In FIG. 16, (c) shows an image corrected by performing image shift processing as distortion correction using different shift amounts for the respective color components on the restored image shown in (b) so as to correct the distortion component and the color shear component to locate the object images of R, G and B at the original position P.

On the other hand, performing the image restoration processing on the input image shown in (a) using the image restoration filters described in this embodiment which have both blur correction function and image shift function for the respective color components correct the input image such that the object images of R, G and B have their original rectangular profile as shown in (b1). Further, simultaneously therewith, the positions of the object images are shifted to the original position P.

As described above, this embodiment can perform the correction processing for the blur component (that is, the image restoration processing), the correction processing for the distortion component (that is, the image shift processing) and the correction processing for the color shear component, which have been separately performed in conventional image processing, in one (single) image restoration processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2008-252324, filed on Sep. 30, 2008, and 2008-252323, filed on Sep. 30, 2008 which are hereby incorporated by reference herein in their entirety.

What is claimed is:

1. An image processing method for processing an image generated by image pickup using an optical system, comprising:
   a step of acquiring the image; and
   a step of performing image restoration processing on the image using an image restoration filter created such that its filter values have a two-dimensional distribution based on aberration information of the optical system,
   wherein the image restoration filter is created by performing inverse Fourier transformation on a function created based on an inverse function of an optical transfer function of the optical system, and
   wherein the image restoration filter is a filter in which a position of a cell having a maximum absolute value among the filter values is shifted with respect to a position of a center cell of the image restoration filter by a shift amount according to at least one of an amount of distortion aberration of the optical system and an amount of chromatic aberration of magnification of the optical system, and which reduces a blur component of the image and at least one of a component of distortion aberration and a component of chromatic aberration of magnification of the image.

2. An image processing method according to claim 1, wherein, in the step of performing the image restoration processing, information on an image pickup condition is acquired, and the image restoration filter selected or created based on the information on the image pickup condition is used.

3. An image processing method according to claim 1, wherein, in the step of performing the image restoration processing, convolution processing using the image restoration filter is performed on the image.

4. An image processing method according to claim 1, wherein, in the step of performing the image restoration processing, plural image restoration filters for plural colors are used as the image restoration filter, the image restoration filters having different two-dimensional distributions of the filter values from each other, and
   wherein the shift amount of the position of the cell having the maximum absolute value with respect to the position of the center cell in each image restoration filter corresponds to the amount of distortion depending on an image height and the amount of chromatic aberration of magnification.

5. An image processing method according to claim 1, wherein the image restoration filter having only cell value distribution data for reducing the blur component is prepared as the stored filter, and data of the shift amount of the cell having the maximum absolute value is separately prepared.

6. An image processing method according to claim 5, wherein the shift amount of the cell having the maximum absolute value is stored in a memory as a function based on an image height.

7. An image processing method according to claim 1, wherein the number of cells of the image restoration filter is different according to the distortion aberration amount.

8. An image processing method according to claim 1, wherein if a cell value distribution of the image restoration filter protrudes from an original cell area when the cell value distribution is moved, the number of cells of the image restoration filter is increased.

9. An image processing method according to claim 1, wherein the step of performing image restoration processing includes changing the image restoration filter for each of plural areas divided according to an image height in the image.

10. An image processing method according to claim 1, further comprising:
    a step of correcting the image restoration filter according to a signal value of a pixel in the image.

11. An image processing apparatus processing an image generated by image pickup using an optical system, comprising:
    a memory part configured to store an image restoration filter created such that its filter values have a two-dimensional distribution based on aberration information of the optical system; and
    an image restoring part configured to perform image restoration processing on the image using the image restoration filter,
    wherein the image restoration filter is created by performing inverse Fourier transformation on a function created based on an inverse function of an optical transfer function of the optical system, and
    wherein the image restoration filter is a filter in which a position of a cell having a maximum absolute value among the filter values is shifted with respect to a position of a center cell of the image restoration filter by a shift amount according to at least one of an amount of distortion aberration of the optical system and an amount of chromatic aberration of magnification of the optical system, and which reduces a blur component of the image and at least one of a component of distortion aberration and a component of chromatic aberration of magnification of the image.

12. An image processing apparatus according to claim 11, wherein, the image restoring part uses plural image restoration filters for plural colors as the image restoration filter, the image restoration filters having different two-dimensional distributions of the filter values from each other, and
    wherein the shift amount of the position of the cell having the maximum absolute value with respect to the position of the center cell in each image restoration filter corresponds to the amount of distortion depending on an image height and the amount of chromatic aberration of magnification.

13. An image pickup apparatus comprising:
    an image pickup system configured to photoelectrically convert an object image formed by an optical system to generate an image; and
    an image processing apparatus configured to process the image,
    wherein the image processing apparatus comprising:
    a memory part configured to store an image restoration filter created such that its filter values have a two-dimensional distribution based on aberration information of the optical system; and
    an image restoring part configured to perform image restoration processing on the image using the image restoration filter,
    wherein the image restoration filter is created by performing inverse Fourier transformation on a function created based on an inverse function of an optical transfer function of the optical system, and
    wherein the image restoration filter is a filter in which a position of a cell having a maximum absolute value among the filter values is shifted with respect to a position of a center cell of the image restoration filter by a shift amount according to at least one of an amount of distortion aberration of the optical system and an amount of chromatic aberration of magnification of the optical system, and which reduces a blur component of the image and at least one of a component of distortion aberration and a component of chromatic aberration of magnification of the image.

14. A non-transitory recording medium stored therein an image processing computer program causing a computer to process an image generated by image pickup using an optical system, comprising:

a step of acquiring the image; and a step of performing image restoration processing on the image using an image restoration filter created such that its filter values have a two-dimensional distribution based on aberration information of the optical system, wherein the image restoration filter is created by performing inverse Fourier transformation on a function created based on an inverse function of an optical transfer function of the optical system, and wherein the image restoration filter is a filter in which a position of a cell having a maximum absolute value among the filter values is shifted with respect to a position of a center cell of the image restoration filter by a shift amount according to at least one of an amount of distortion aberration of the optical system and an amount of chromatic aberration of magnification of the optical system, and which reduces a blur component of the image and at least one of a component of distortion aberration and a component of chromatic aberration of magnification of the image.

15. An image processing method for processing an image generated by image pickup using an optical system, comprising:

a step of acquiring the image; and a step of performing image restoration processing on the image using an image restoration filter created such that its filter values have a two-dimensional distribution based on aberration information of the optical system, wherein, in the step of performing the image restoration processing, plural image restoration filters for plural colors are used as the image restoration filter, the image restoration filters having different two-dimensional distributions of the filter values from each other, and wherein the shift amount of the position of the cell having the maximum absolute value with respect to the position of the center cell in each image restoration filter corresponds to the amount of chromatic aberration of magnification, and which reduces a blur component of the image and a component of chromatic aberration of magnification of the image.

16. An image processing method for processing an image generated by image pickup using an optical system, comprising:

a step of acquiring the image; and a step of performing image restoration processing on the image using an image restoration filter created such that its filter values have a two-dimensional distribution based on aberration information of the optical system, wherein the image restoration filter is created by performing inverse Fourier transformation on a function created based on an inverse function of an optical transfer function of the optical system, and wherein the image restoration filter is a filter in which a position of a cell having a maximum absolute value among the filter values is shifted with respect to a position of a center cell of the image restoration filter by a shift amount according to at least one of an amount of distortion aberration of the optical system and an amount of chromatic aberration of magnification of the optical system, and which reduces at least one of a component of distortion aberration and a component of chromatic aberration of magnification of the image.

* * * * *